United States Patent [19]

Maesk

[11] 4,403,595

[45] Sep. 13, 1983

[54] BARBECUE GRILL

[76] Inventor: Stanley J. Maesk, 39 Celeste St., Manchester, N.H. 03103

[21] Appl. No.: 269,698

[22] Filed: Jun. 2, 1981

[51] Int. Cl.$^3$ .................... A47J 37/00

[52] U.S. Cl. .................... 126/25 A; 126/41 B

[58] Field of Search .................... 126/25 R, 25 P, 30, 126/9 B, 41 B, 41 C, 14, 147, 39, 144

[56] References Cited

U.S. PATENT DOCUMENTS

| | | | |
|---|---|---|---|
| 2,511,594 | 1/1950 | Loffredo | 126/25 A |
| 2,600,234 | 6/1952 | Foley | 126/25 A |
| 3,319,562 | 5/1967 | Turcott | 126/9 R |
| 3,832,989 | 9/1974 | Belford | 126/147 |
| 3,999,422 | 12/1976 | Einto | 126/25 R |

FOREIGN PATENT DOCUMENTS

| | | | |
|---|---|---|---|
| 472274 | 11/1914 | France | 126/30 |

*Primary Examiner*—Samuel Scott
*Assistant Examiner*—G. Anderson
*Attorney, Agent, or Firm*—Thomas N. Tarrant

[57] ABSTRACT

A barbecue grill using a longitudinally extended cage of metal strips for retaining combustible material during combustion and connected to supports for carrying rotatable spits at a plurality of positions around the periphery of the cage.

2 Claims, 1 Drawing Figure

BARBECUE GRILL

BACKGROUND OF THE INVENTION

1. Field of the Invention

The present invention relates to barbecue grills and particularly to such grills carrying rotatable spits.

2. Relation to the Prior Art

It has been common in outdoor barbecues to position spits over a pit or bed or coals. These beds of coals are commonly laid directly on the ground or in metallic pans. The result is an inadequate and poorly controlled supply of combustion air as well as poor uniformity in the distribution of heat. The position of the spits normally directly over the burning material results in a rather limited space available for the spits. This results in exposure of the barbecue material to the maximum amount of smoke and flame produced.

BRIEF SUMMARY OF THE INVENTION

Now in accordance with the present invention a barbecue grill is provided in which the combustible material is retained in a longitudinally extended cage with rotatable spits supported around the periphery of the cage whereby the material being barbecued has increased space availability while being out of the direct path of smoke and flames. At the same time the cage arrangement allows for improved access of combustion air providing more complete and uniform combustion.

BRIEF DESCRIPTION OF THE DRAWING

The FIGURE is an isometric view of a barbecue grill in accordance with the invention.

DESCRIPTION OF THE PREFERRED EMBODIMENT

Figure 1:
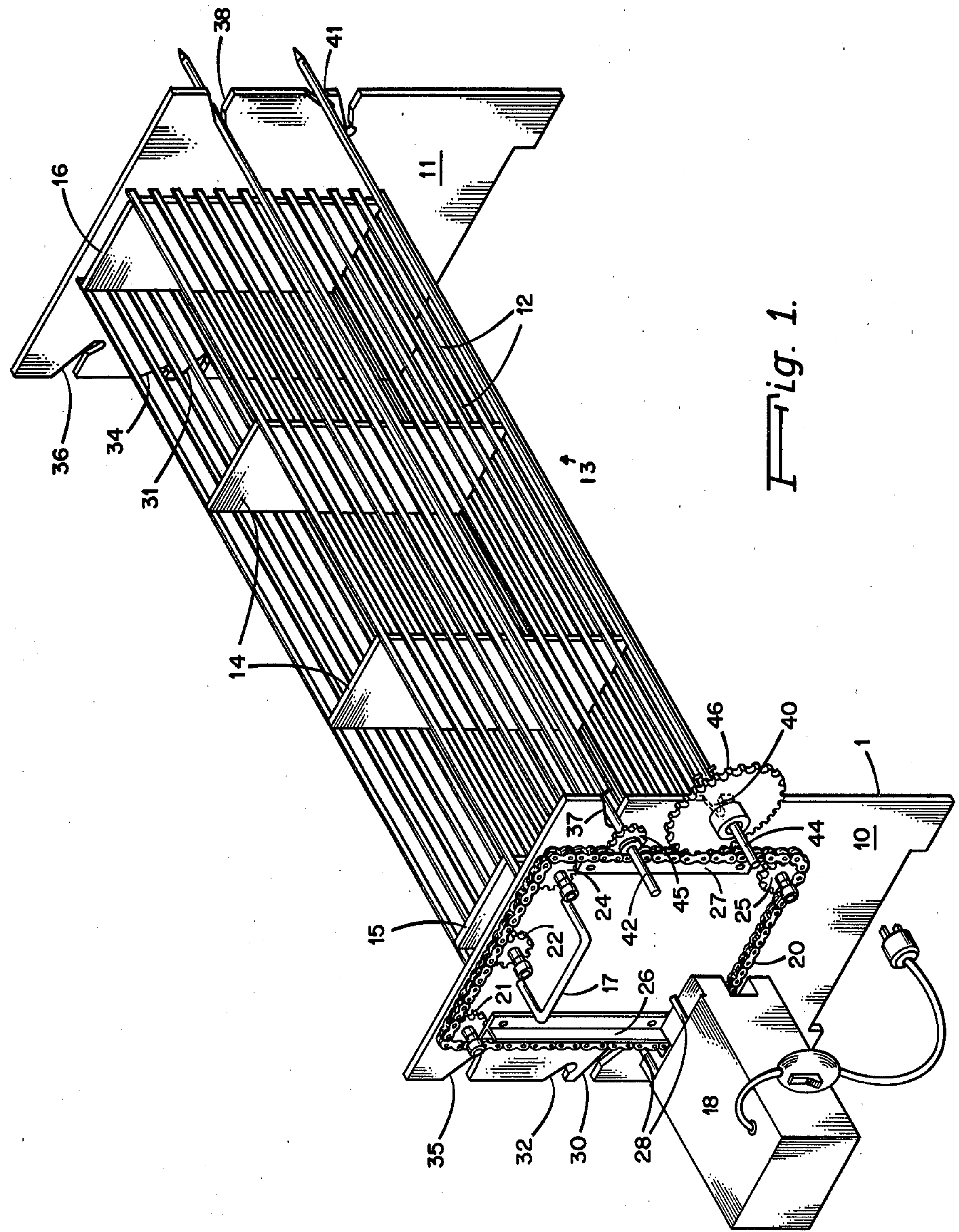

The barbecue grill of the invention is supported between first end support 10 and second end support 11 suitably made of steel plates. Plates 10 and 11 are connected in spaced relationship by longitudinally extending metal strips 12. Metal strips 12 are arranged in a longitudinally extending rectangular configuration to form cage 13. Each strip is connected at a first end to plate 10 and at a second end to plate 11, suitably by welding. Metal strips 12 are suitably one centimeter wide by two to five millimeters thick and may be spaced one and a half centimeters apart to form two sides and a bottom leaving an open top. In a preferred design, strips 12 take the form of cylindrical rods about one centimeter in diameter. Frames or solid plates 14, 15 and 16 positioned inside the cage formed by strips 12, provide additional support to eliminate sagging, warping or bending of strips 12. While frames 14, 15 and 16 are shown as solid plates, they may instead be rectangular frames open in the middle. Frame 15 is positioned close to first end support 10. Second frame 16 is positioned close to end support 11. Additional frames 14, in a number depending on the length of the grill, are spaced evenly between frames 15 and 16. Each of metal strips 12 is suitably connected to each frame by welding. End supports 10 and 11 extend below metal strips 12 to support cage 13 clear of the ground. Supports 10 and 11 also extend laterally beyond the sides of cage 13 to provide means for supporting spits.

End support 10 has handle 17 mounted centrally near the top on the side facing away from cage 13. A similar handle (not shown) on plate 11 provides means for carrying. Motor 18 for driving rotatable spits is also mounted to plate 10. Motor 18 drives chain 20 by suitable reduction gears and sprocket (not shown). Chain 20 is depicted as the type used on bicycles and is supported along a rectangular path by sprockets 21, 22, 24 and 25 all mounted to plate 10. Guide rails 26 and 27 mounted from plate 10 are positioned adjacent to the vertically extended positions of chain 20 to prevent inward flexing of the chain. One side of plate 10 carries three slots 30, 32 and 35 facing similar slots 31, 34 and 36 in plate 11. The other side of plate 10 has slots 37 and 40 facing similar slots 38 and 41 in plate 11. Spits 42 and 44 are depicted with spit 42 resting in slots 37 and 38, and spit 44 resting in slots 40 and 41 Slots 37 and 38 are deep so as to bring spit 42 close to chain 20. Sprocket 45 engaging chain 20 is thus a sprocket of small diameter. Slots 40 and 41 are relatively shallow compared to slots 37 and 38 so that spit 44 is spaced relatively distant from chain 20 and sprocket 46 on spit 44 has a diameter relatively large compared to that of sprocket 45. Thus spit 44 is designed for supporting a fairly large piece of meat for barbecuing while spit 42 is designed to carry small pieces. At the same time the differences in sprocket diameters results in spit 44 revolving at a much slower rate than spit 42. The number of slots for carrying spits and the depth of the slots is not critical and can be made to provide a maximum of versatility. It will be seen that guide rails 26 and 27 are used to maintain chain 20 in firm contact with the sprockets of the various spits. The slots for carrying the spits are angled downwardly and are desirably notched with a steeper downward angle at their inner ends to keep the spit sprockets in firm engagement with chain 20. In operation, cage 13 is loaded with charcoal or other material suitable for barbecue purposes, ignited with charcoal lighter or other means and allowed to burn until smoke is largely dissipated and an adequate temperature is reached. Meat to be cooked is placed on spits having appropriate sprocket sizes and the spits are placed in the proper slots. Motor 18 can be started before or after the spits are inserted.

The number of spits that may be used simultaneously is limited by the size of the barbecue grill as well as by the food being cooked. It will be recognized that more slots will normally be provided than can be used for spits at any one time. This allows for greater flexibility of choice in the spacing of spits from cage 13 and in the speed of rotation of the spits.

Dimensions, types are thicknesses of metal are selectable within a fairly wide range. For most purposes, the inventive grill will have a cage 13 that is 60 to 120 centimeters in length, 30 to 50 centimeters in height and 10 to 30 centimeters in width. These dimensions are not critical limitations, but merely the most practical dimensions for most purposes. The spacing of strips 12 is selected to retain the most usual sizes of combustion material and the thickness and composition of the metal is selected to withstand the barbecue temperatures taking into consideration also the cost of the metal and its weight where portability is required. Thus 6 millimeter steel plate is probably the heaviest metal suitable for plates 10 and 11. Cast metals will usually permit use of lighter weight components while still providing adequate resistance to the effects of heat. Thus considerable variation in the configuration of the inventive grill is contemplated. Nor is the rectangular design necessary. An oval cross-section can be used, by way of example.

Thus while a specific embodiment of the invention has been described, it is intended to cover the invention as set forth in the scope of the following claims.

I claim:

1. A barbecure grill comprising:

(a) a first end support;

(b) a second end support;

(c) a plurality of metal strips extending from said first end support to said second end support so as to form a cage open at the top;

(d) a plurality of matching slots around the peripheries of said first end support and said second end support for receiving rotatable spits, said slots being lateral of said cage and provided with a plurality of different depths whereby the distance of a spit from said cage can be selected;

(e) a motor driven chain mounted on said first end support with said chain supported on sprockets so as to pass adjacent to said slots; and, (f) spits having sprockets of a plurality of different diameters whereby a spit having a large diameter sprocket will be driven by said chain when placed in a shallow slot and a spit having a small diameter sprocket will be driven by said chain when placed in a deep slot.

2. A barbecue grill according to claim 1 wherein said slots angle downward and terminate with a notch of greater downward angle to assure engagement of said chain with a driven spit sprocket.

* * * * *